United States Patent
Venkatramani et al.

(10) Patent No.: US 12,547,340 B2
(45) Date of Patent: Feb. 10, 2026

(54) MULTI-TYPE DISK DRIVE SUPPORT USING A COMMON SERVER STORAGE BACKPLANE

(71) Applicant: Cisco Technology, Inc., San Jose, CA (US)

(72) Inventors: Srisai ganesh v Venkatramani, Bangalore (IN); Yogindar Das Yasodhar, Bangalore (IN); Sarathy Venkatakrishnan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 16 days.

(21) Appl. No.: 18/657,553

(22) Filed: May 7, 2024

(65) Prior Publication Data

US 2025/0272020 A1 Aug. 28, 2025

(30) Foreign Application Priority Data

Feb. 26, 2024 (IN) .............................. 202441013876

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ..... G06F 3/0655; G06F 3/0604; G06F 3/0673
See application file for complete search history.

(56) References Cited

U.S. PATENT DOCUMENTS

| | | | |
|---|---|---|---|
| 10,699,668 B1 * | 6/2020 | Gupta | G06F 3/1423 |
| 2015/0067226 A1 | 3/2015 | Iskandar et al. | |
| 2019/0146889 A1 | 5/2019 | Cannata et al. | |
| 2020/0293459 A1 * | 9/2020 | Gnanasambandam | |
| | | | G06F 18/22 |
| 2021/0117361 A1 | 4/2021 | Zhang et al. | |

(Continued)

FOREIGN PATENT DOCUMENTS

| | | |
|---|---|---|
| CN | 109992074 A | 7/2019 |
| CN | 115061958 A | 9/2022 |

(Continued)

OTHER PUBLICATIONS

Search Report and Written Opinion for International Application No. PCT/US25/16639, Dated Jun. 5, 2025, 20 pages.

(Continued)

*Primary Examiner* — Zhuo H Li
(74) *Attorney, Agent, or Firm* — Lee & Hayes, P.C.

(57) ABSTRACT

A Baseband Management Controller (BMC) operably coupled to a storage controller of a storage unit to determine based on a detected output, a first type of slot coupled to the BMC for emulating when attaching the storage unit of a first type, or a second type of slot for emulating when attaching the storage unit of a second type. Reading a use configuration option associated with configuring logic of the BMC for attaching either the storage unit of the first type or for attaching the storage unit of the second type. Determining whether to directly attach the storage unit of the first type based on a logic of the BMC to a processor or to indirectly attach the storage unit of a second type based on the logic of the BMC to the processor for advertising of at least one slot to be emulated as a U.2 slot.

20 Claims, 7 Drawing Sheets

(56) References Cited

U.S. PATENT DOCUMENTS

2021/0279198 A1 9/2021 Olarig et al.
2021/0374085 A1 12/2021 Olarig et al.
2022/0365676 A1* 11/2022 Nguyen ................ G06F 3/0683

FOREIGN PATENT DOCUMENTS

| CN | 116009785 A | 4/2023 |
| CN | 117555841 A | 2/2024 |
| WO | 2023160699 A1 | 8/2023 |

OTHER PUBLICATIONS

Invitation to Pay Additional Fees and International Search Report and Written Opinion for International Application No. PCT/US25/16639, Dated Apr. 15, 2025, 15 pages.

* cited by examiner

MULTI-TYPE DISK DRIVE SUPPORT USING A COMMON SERVER STORAGE BACKPLANE

CROSS-REFERENCE TO RELATED APPLICATIONS

This Application claims priority to and benefit of Indian Provisional Patent Application No. 202441013876, filed on Feb. 26, 2024, the entire content of which is incorporated herein by reference.

TECHNICAL FIELD

This disclosure relates in general to a universal backplane management architecture, and in particular, methods and systems for a flexible back-plane management that supports multiple drive options with minimal unit changes for enhanced flexibility and scalability.

BACKGROUND

To enable different drive types, a server vendor may have to design multiple stock-keeping units (SKUs) that cater to different back-planes where each backplane is individually configured to support a different drive type (e.g., 24 SFF (Small Form Factor), all NVMe, 24 SFF SAS/SATA or Tri-mode SKU). This multi-device personalized configuration has proved to be costly and in some cases, may be deemed cost-prohibitive by customers for deployment. For example, because of multiple bottlenecks that may occur during production phases such as the development, testing, and inventory management, etc., the result is that for customers, each different product designated with a different SKU can become a new and additional costly procurement of having another SKU to support its needs.

It is desirable to overcome at least these drawbacks, by providing methods and systems that enable using a universal (e.g., a single) backplane that is configured with an FPGA (Field Programmable Gate Array) embedded into a Redundant Array of Independent Disk (RAID) motherboard and which can be programmed in one or more modes for multi-device configurations based on user input in which allow one or more slots are configured to emulate different slot types for use by advertising the right signals.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
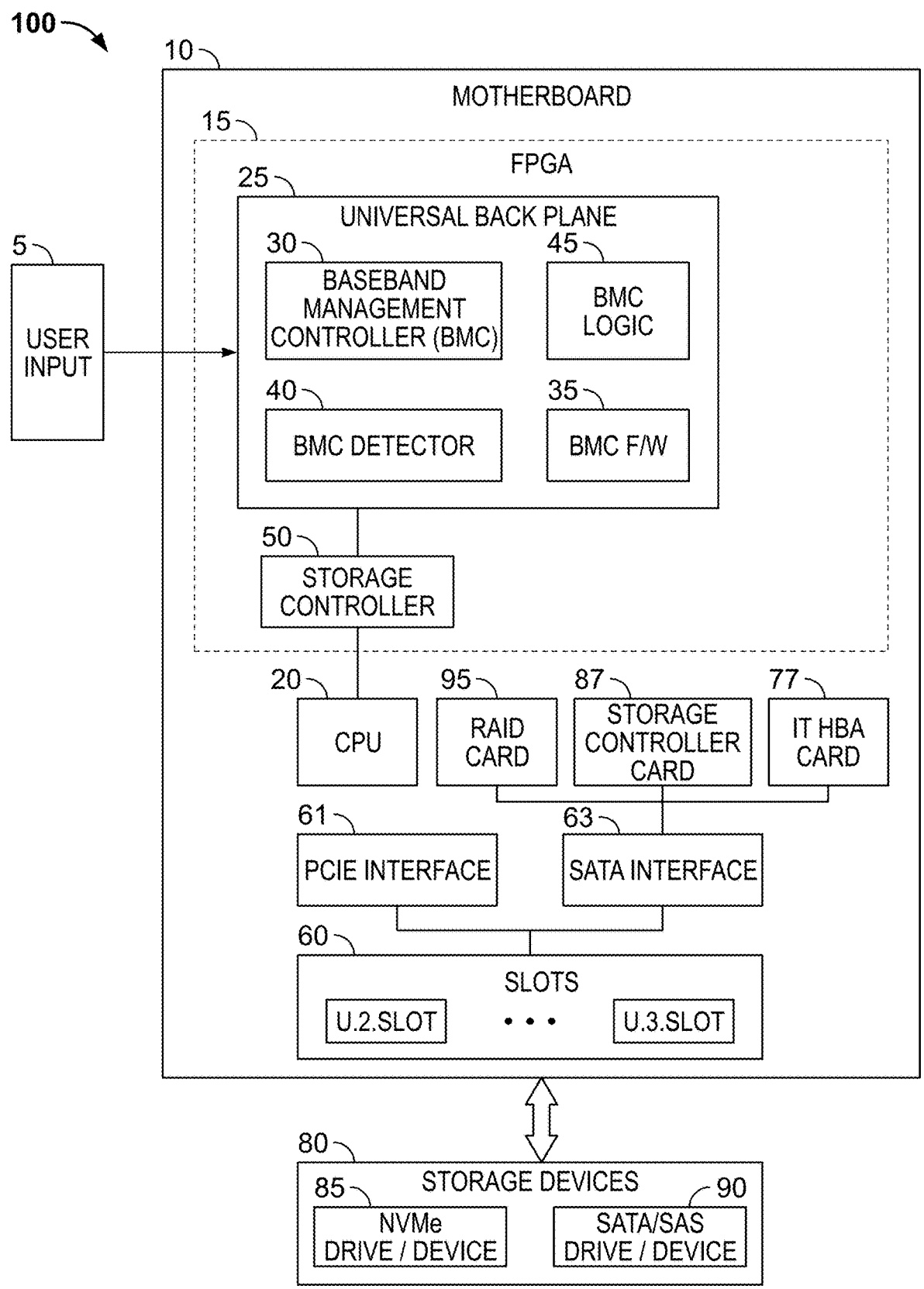
FIG. 1 illustrates a high-level block diagram of the architecture of a universal backplane control system to enable a use configuration option to emulate one or more slots as a U.2 slot or U.3 slot based on an output detected by the Baseband Management Controller (BMC) from a storage controller to connect to different types of storage units according to some embodiments.

With the industry requirement changing drastically to adopt multiple storage types for different use cases, it is becoming imperative for hardware platforms to also become more dynamic and programmable. Hence, it is no longer the case to simply have a nice-to-have feature for server platforms like UCS (Unified Computing System) servers to support multiple drive technologies, it is table-stakes now. For example, a server vendor may implement multiple Stock Keeping Units (SKUs) catering to different backplane designs which in turn can support different drive types: (e.g., 24 SFF (Small Form Factor) all drives of Nonvolatile Memory Express (NVMe), 24 SFF SAS/SATA, or Tri-mode SKU; however, the drawback to this approach of implementing individual backplanes is that it requires multiple different backplanes to manufacture and install for connecting to different drives which is costly. Also, it may require customers to not efficiently use all available slots in a rack to connect to a favored type of storage unit, the result being unused The present disclosure describes a methodology that overcomes the drawback of having to use different backplane configurations to cater to different drives, by providing a universal backplane control system supporting multiple drive types. The universal backplane control system may be enabled using a Field Programmable Gate Array (FPGA) that is embedded into a RAID motherboard configured with an ASIC or chip or part of a system of a chip (SOC). The FPGA may be programmed in one or more modes (as opposed to having multiple different boards) that are configurable based on user input or via a Joint Test Action Group (JTAG).

In an embodiment, the FPGA may be configured in a mode (e.g., user-configured mode) that allows for a user configuration or input in which one or more slots (of a RAID vault or like) is configured to be able to emulate a U.3 slot as U.2 slot or not by advertising the right signals. For example, in one instance, a U.2 slot may be re-configured to emulate a U.3 slot and also be advertised as a U.2 slot for a period of time. In an embodiment, the backplane is implemented with a Baseboard Management Controller (BMC)

logic that is capable of detecting a connected storage controller and emulating the drive configuration option for a U.2 or U.3 drive.

In some embodiments, the present disclose describes systems and processes that achieve the support of different drive types that would ordinarily require using different backplanes, to be supported with a single backplane design providing cost advantages, engineering simplicity; and from a user experience, enabling high-speed caching using SSD drives that directly connect to a CPU as opposed having to navigate about a RAID controller that introduces latency into a system.

The present disclosure describes a baseband management control process that is enabled with the steps as follows: (1) initially, the BMC is configured to detect the storage controller; and (2) in response to a detected storage controller, the BMC determines a use solution for one or more configured options. (3) If the user-configured option is directly attached, the BMC will send a signal to request the FPGA to advertise all slots as U.2. This will cause all the NVMe drives attached to the slot to be capable of being directly connected to the CPU and that SAS/SATA drives to the storage controller card. (4) If the user-configured option (e.g., the user-configured mode in FIG. 1) is RAID attached, the BMC will request the FPGA to advertise all slots as U.3. This is caused by all the SAS/SATA/NVMe drives being attached each one of the slots which are also directly operably connected to the RAID card. (5) If the user-configured option is a default that is system-preferred, the BMC will request the FPGA to advertise all the slots as a U.3 slot if the RAID card is detected. This will cause all the Nonvolatile Memory Express (NVMe) drives attached to the slot to be directly connected to the RAID card. Alternately, if an organization's (e.g., IT host, network host) Host Bus Adapter (HBA) card is detected, the BMC will request FPGA to advertise all slots as U.2 and hence all the Serial Attached SCSI (SAS)/Serial Advanced Technology Attachment SATA drives will be connected to the storage controller.

Also, in an embodiment, the NVMe drive is configured to be in proximity to the processor (e.g., the CPU) and to take advantage of its proximity and nearness to the processor (by using a single backplane layer) to interconnect faster with the processor which achieves a more flexible hardware design. In an embodiment, the NVMe drive may be conveniently routed to one or more CPU root ports, and one or more SAS/SATA devices to a RAID controller. With this implementation, there is not required a dedicated or a specified set of slots, as the configuration enables a set of one or more hybrid slots (as opposed to dedicated slots) to be coupled to logic associated with one or more NVMe/SAS/SATA drives. In this instance, the FPGA Logic (e.g., the BMC logic) can be reprogrammed by the BMC via firmware (f/w) updates or the like based on system requirements.

Overview

The present disclosure describes techniques to design a universal (singular) hardware backplane to support multiple drive and storage technologies without putting together (i.e., spinning) different backplane hardware. In implementation, one or more processes are provided with logic to configure a hybrid set of slots to emulate one or more U.3 slots as a U.2 or to be a U.3 slot by advertising its rights as needed and/or detecting connected drives. The different slots U.3 and U.2 are necessary because for different storage units, in this environment, the NVMe (Non-Volatile Memory Express) and SATA (Serial ATA) are configured for use with different and incompatible interfaces (e.g., requiring two different interfaces) when connecting storage devices to a CPU. The NVMe is a newer protocol than the SATA protocol, that uses the PCIe (Peripheral Component Interconnect Express) bus to connect storage devices, while the SATA, an older interface is designed for (traditional) hard disk drives (HDDs) and SATA-based solid-state drives (SSDs). The eNVMe drives use a PCIe connector and interface, typically M.2 or U.2/SFF-8639 form factors, while SATA drives use a separate SATA data cable and power cable to connect to the motherboard's SATA ports. The NVMe may be considered a more advanced protocol that is better configured for high-performance solid-state drives (SSDs) and other non-volatile memory. The SATA is a protocol is implemented for hard disk drives (HDDs), with lower performance compared to the NVMe.

In some embodiments, when in use, the NVMe drives may require an NVMe host controller, which can be integrated into the chipset or provided through a separate PCIe add-in card. The SATA drives may use a SATA host controller, which is integrated into the motherboard's chipset. Due to these differences, an NVMe drive is not directly connected to a SATA port or slot, and a SATA drive is not connected to an NVMe port or slot. Each device requires its respective host controllers and interfaces to operate.

In some embodiments, the present disclosure describes methods and systems of a universal backplane that may be enabled using an FPGA (Field Programmable Gate Array) which is embedded into a RAID motherboard configured with an ASIC or chip or part of a system of a chip (SOC). The FPGA may be programmed in one or more modes (as opposed to having multiple different boards) that are configurable based on user input or via a JTAG. In an embodiment, the FPGA may be configured in a mode (e.g., user-configured mode) that allows for a user configuration or input in which one or more slots (of a RAID vault or like) is configured to be able to emulate a U.3 slot as U.2 or to be a U.3 slot by advertising the right signals. For example, a U.2 slot may be re-configured to emulate a U.3 slot. In an embodiment, the backplane is implemented with a baseboard management controller (BMC) logic that is capable of detecting a connected storage controller and emulating the drive configuration option for a U.2 or U.3 drive.

In some embodiments, a BMC is configured on a backplane and connected to a storage controller that controls a storage unit and receives an output from the storage controller. The BMC determines based on a detected output from the storage controller, one of a first or second type of slot coupled to the backplane upon attaching a storage of either a first type or a second type. The BMC is further configured to read a use configured option associated with a different logic of the BMC for attaching a storage unit of multiple types such as the first and second types. The BMC determines based on the reading of the use configured option, whether to directly attach the storage unit to a CPU or to indirectly attach the storage unit to the CPU. If the storage unit is to be directly attached to the processor, then the BMC may advertise slots to be emulated as a U.2 slot to enable a direct attachment of the storage unit to the processor.

In some embodiments, if the storage unit is determined to be indirectly attachable to the backplane based on reading of the use configuration option by the BMC, then the BMC may enable a request via logic of the BMC, for advertising at least one slot of a set of slots coupled to the BMC to be emulated as a U.3 slot to enable an indirect attachment of the storage unit to the processor.

In some embodiments, if the use configuration option enables the direct attachment of the storage unit to the processor, then the BMC may request advertisement by the programmable chip (e.g., an FPGA chip) of at least one slot as a U.2 slot.

In some embodiments, the BMC may cause at least one storage unit that is configured as the NVMe drive for the direct attachment to the processor by using a U.2 emulated slot. The U.2 slot may be configured to enable the direct attachment to the processor using a storage controller card via a serial bus coupling. If the use configuration option enables the indirect attachment of the storage unit to the processor, then the BMC may request via the RAID controller, advertisement of at least one slot as a U.3 slot. Also, the BMC may cause the storage unit which is configured as an NVMe drive to be indirectly attached to the processor via a U.3. slot and for a direct connection of the storage unit to a RAID card.

In some embodiments, if the use configuration option is for an indirectly attached storage unit to the backplane and which is deemed a preferred option, then the BMC may request, advertisement by the programmable chip of a slot as an emulated U.3 slot in response to a detection of the RAID card by the BMC. Also, the BMC may cause the storage unit which is configured as the NVMe drive to be attached to the emulated U.3 slot and to be directly connected to a RAID card in response to the detection of the RAID card by the BMC. In some embodiments, in response to a detection of the Host Bus Adapter (HBA) by the BMC, the BMC may request the programmable chip to advertise at least one slot as a U.2 slot for a direct connection to a storage controller card to the processor via a serial bus coupling.

These and other aspects, objects, features, and advantages of the examples will become apparent to those having ordinary skill in the art upon consideration of the following detailed description of illustrated examples.

Example Embodiments

Turning now to the drawings, in which like numerals indicate like (but not necessarily identical) elements throughout the figures, examples are described in detail.

FIG. 1 illustrates a high-level block diagram of a backplane architecture depicting a method to detect at the output of a storage controller, to read a use configuration option to enable directly attaching NVMe drives or another use configuration for at output by a backplane controller (BMC) with an FPGA that is capable to be able to emulate a U.3 slot as a U.2 or U.3 slot by advertising the right signals according to some embodiments.

As depicted in FIG. 1, the example architecture of a backplane control system 100 may comprise a motherboard 10 that includes components making up a system-on-chip (SoC) including a processor or processing unit such as a CPU 20, a Baseboard Management Controller (BMC) 30, BMC logic (e.g., FPGA logic) 45 that may be configured for one or more use configuration options, detecting logic (e.g., the logic of baseboard management controller (BMC) detector 40) for detecting an output 55 from a storage controller 50, baseboard management controller (BMC) firmware (f/w) 35 that can be updated as needed. The BMC detector 40 determines from an output 55 of the storage controller 50, the use configuration option to be selected with BMC logic 45 for different storage units to be connected. The BMC 30 may access firmware 35 that is stored in memory or storage 37 providing use configuration option applications or other service components to the BMC 30.

Referring further to FIG. 1, the backplane 25 may be considered a universal backplane that may be enabled using an FPGA (Field Programmable Gate Array) 15 which is embedded into the motherboard (e.g., a RAID motherboard) configured with an ASIC or chip or part of a system of a chip (SOC) (e.g., the CPU 20). The FPGA 15 may be programmed in one or more modes (as opposed to having multiple different boards) that are configurable based on user input or via a JTAG. In an embodiment, the FPGA 15 may be configured in a mode (e.g., user-configured mode) that allows for a user configuration or input (e.g., user input 5) in which one or more slots (of a RAID vault or like) is configured to be able to emulate a U.3 slot as U.2 or to be a U.3 slot by advertising the right signals. For example, a U.2 slot may be re-configured to emulate a U.3 slot for a period of time as determined by the BMC 30. In an embodiment, the backplane is implemented with a baseboard management controller (BMC) logic 45 that is capable of detecting a connected storage controller 50 or a switching of a storage controller 50 output for a particular drive option and emulating the drive configuration option for a U.2 drive or U.3 drive.

The BMC 30 via the backplane detector 40 detects the storage controller's output 55 and reads the configuration option. For example, the Drive type identification is performed by sampling the outputs of pins from the drive interfaces. The values of these outputs of pins are reported to the BMC detector 40 with a status and Control Descriptor Command. The drive pin states, used in conjunction with the backplane mapping data, allow the appropriate configuration to be applied to the storage controller 50 and the detection of the output 55 by the BMC 30.

Further, referring to FIG. 1, the FPGA 15 is a programmable chip that can be configured to interface logic for use with multiple slot types. For example, if the use configuration option (e.g., the user configured option) is for an indirectly attached storage unit (e.g., storage devices 80) to the CPU 20 and which is a preferred option, then the FPGA 15 may be programmed to advertise all the slots 60 as U.3 slots in response to a detection of the RAID card 95 by the BMC 30. This will cause all the storage devices 80 (SAS/SATA drives 90, and NVMe drives 85) to be attached to the U.3 slots to be directly connected to the RAID card 95.

If the use-configured option is to be directly attached, the BMC 30 will request the FPGA 15 to advertise all slots 60 as U.2. slots. This will cause all the NVMe drives 85 attached to the slots 60 (e.g., the U.2. slots) to be directly connected to CPU 20 and SAS/SATA drives 90 to the storage controller card 87. If an IT HBA card is detected, the BMC 30 will request the FPGA 15 to advertise all the slots 60 as U.2. slots and hence all the SAS/SATA drives 90 will be connected to the storage controller 50. The PCIe interface 62 is used to connect the NVMe drive 85 to the RAID card 87 and other components on the motherboard 10. The SATA interface 63 is used to connect the SATA/SAS (e.g., Solid State Drives (SSD)) to various components on the motherboard 10.

Figure 2:
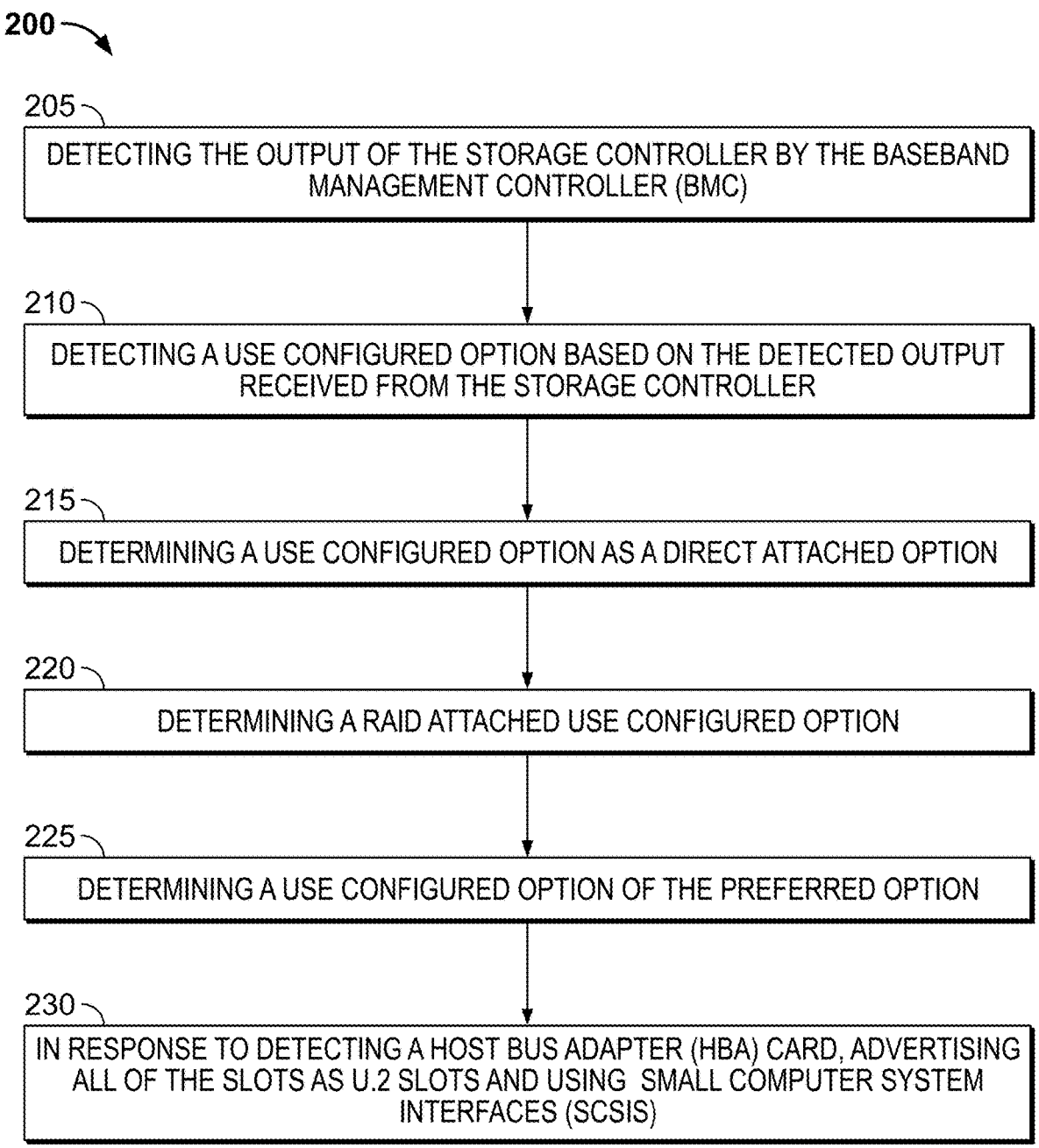
FIG. 2 illustrates a flow diagram of an exemplary universal backplane control system used in FIG. 1 that enables the advertising of one or more slots configured to emulate a U.3 slot from a U.2 slot according to some embodiments.

FIG. 2 is a flow diagram 200 that depicts the BMC determining a use configuration option for advertising one or more slots as U.2 or U.3 of the system according to some embodiments. The methods illustrated in FIG. 2 are described hereinafter with respect to the components of the example backplane control system of FIG. 1. The methods of FIG. 2 may also be performed with other systems and in other environments. The operations described with respect to FIG. 2 can be implemented as executable code stored on a computer or machine-readable non-transitory tangible storage medium (e.g., floppy disk, hard disk, ROM, EEPROM, nonvolatile RAM, CD-ROM, etc.) that are completed based on execution of the code by a processor or CPU implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In FIG. 2, at step 205, the output of the storage controller 50 is detected by the BMC 30 for different user configurations and uses different BMC logic 45 to connect to either an NVMe drive 85 or a SATA/SAS drive 90. At step 210, the BMC 30 determines a use configured option (e.g., user-configured option). This may be for a direct connection to the CPU 15 or an indirect connection to the CPU 15. The indirect connection can be used to provide some protection to the CPU 15. At step 215, in an example, if it is determined by the output of the storage controller 50 for a direct connection, then the BMC 30 will send a signal to request the FPGA 15 to advertise all slots 60 as U.2. This will cause all the NVMe drives attached to the slot to be capable of being directly connected to the CPU 20 and that SAS/SATA drives 90 to the storage controller card 87. At step 220, if it is determined by the BMC 30 that the use-configured option (e.g., the user-configured mode) is RAID attached, the BMC 30 will request the FPGA to advertise all slots 60 as U.3. This is caused by all the SAS/SATA/NVMe drives (storage devices 80) being attached to each one of the slots which are also directly operably connected to the RAID card.

At step 225, if the use-configured option is a default that is system-preferred determined by the BMC 30; the BMC 30 will request the FPGA 15 to advertise all the slots as a U.3 slot. If the RAID card 95 is detected, this will entail all the Nonvolatile Memory Express (NVMe) drives 85 attached to the slot to be directly connected to the RAID card 95. At step 230, alternately, if an organization's (e.g., IT host, network host) Host Bus Adapter (HBA) card 77 is detected, the BMC 30 will request FPGA 15 to advertise all slots 60 as U.2 and hence all the Small Computer System Interfaces (SCSIs) are used. For example, in this case the SATA interfaces 63 that connect the storage devices 80 of the serial attached SCSI (SAS) drives and Serial Advanced Technology Attachment (SATA) drives 90 will be connected to the storage controller 50.

Figure 3:
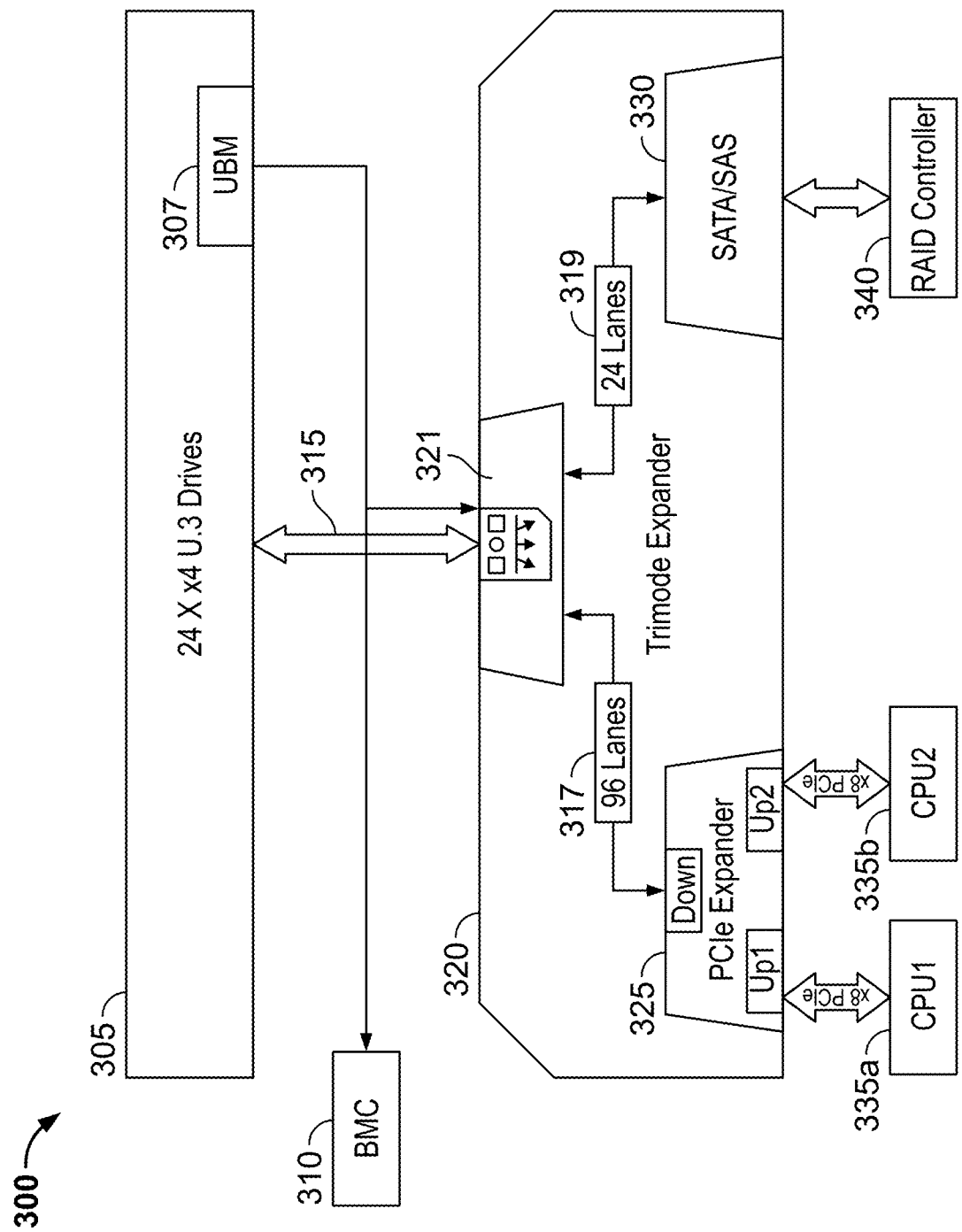
FIG. 3 illustrates an example architecture of a Redundant Array of Independent Disk (RAID) tri-mode device that may identify a storage unit attached and send instructions for operating switched modes of operations for a universal backplane management (UBM) unit according to some embodiments.

FIG. 3 illustrates an example architecture of a RAID tri-mode device that may identify a storage unit attached and send instructions for operating switched modes of operations for a universal backplane management (UBM) unit according to some embodiments. In FIG. 3, there is shown a universal tri-mode system 300 that includes a set of drives in a drive bay 305 that are attachable to U.3 slots (e.g., 24×x4 U.3 drives) that interface with a universal backplane management (UBM) controller that is coupled 315 to a Baseband Management Controller (BMC) 310 to send information and to a tri-mode expander 320. The tri-mode expander 320 exchanges information with the UBM 307 about the attachable drives to U.3 slots. The tri-mode expander 320 is configured with two different sets of channels that comprise a first channel set 317 of lanes which are configured into 96 lanes, and a second channel set 319 of lanes which are configured into 24 lanes. Each channel set of lanes is individually switched too, by a programmable chip (e.g., an FPGA 321) that is embedded in the tri-mode expander 320. The first channel set 317 is switched on each lane to the PCIe expander interface 325 to directly connect the U.3 slotted drive to the CPU 335a or the CPU 335b. While only 2 CPUs are represented in FIG. 3, it is contemplated that this number of CPUs is not limited and can be expanded as desired. The second channel set 319 is switched on each lane to the SATA/SAS interface 330 to RAID controller 340 for an indirect connection to a CPU or processor.

In some embodiments, the tri-mode expander 320 is an FPGA-driven tri-mode expander. The drive bay 305, while shown with U.3 slotted drives, may comprise a variety of different drive types. The UBM 307 identifies the device or drive attached and reports or identifies the attached device to the FPGA of the tri-mode expander 320. The FPGA 321 may consist of be configured to include one or more high-speed lane switches that can be individually controlled by the logic of the FPGA. In some embodiments, one or more high-speed lane switches may be controllable by the BMC 310.

In some embodiments, the tri-mode expander 320 may be configured with a RAID/IOC controller that receives the set of storage devices 80 (e.g., the SAS/SATA/NVMe drives). In implementation, attachability for the SATA/SAS does not insert an additional layer of separation between the SAS/SATA drives and the CPU 20. However, for the NVMe drives or devices that are configured to be in proximity to the CPU; using a RAID/IOC controller inserts an additional layer between the NVMe drives or devices and the CPU which may be deemed a limitation in use. With the tri-mode expander 320 and the use of the embedded FPGA shown in FIG. 3, there is no additional layer required, and therefore the proximity of the NVMe to the CPU is maintained.

In some embodiments, the NVMe drives and/or devices of the drive bay 305 can be flexibly routed to CPU root ports of CPU1 and CPU2 of FIG. 3, and SAS/SATA drives and/or devices to a RAID controller via a RAID card. Further, with this design, no specific slot is required to be configured as a dedicated hybrid port attaches to the NVMe/SAS/SATA drives as the FPGA logic of the FPGA 321 that may be reprogrammed via the BMC 310 for attachment to the specific slot that is needed based on the use configured option.

Figure 4:
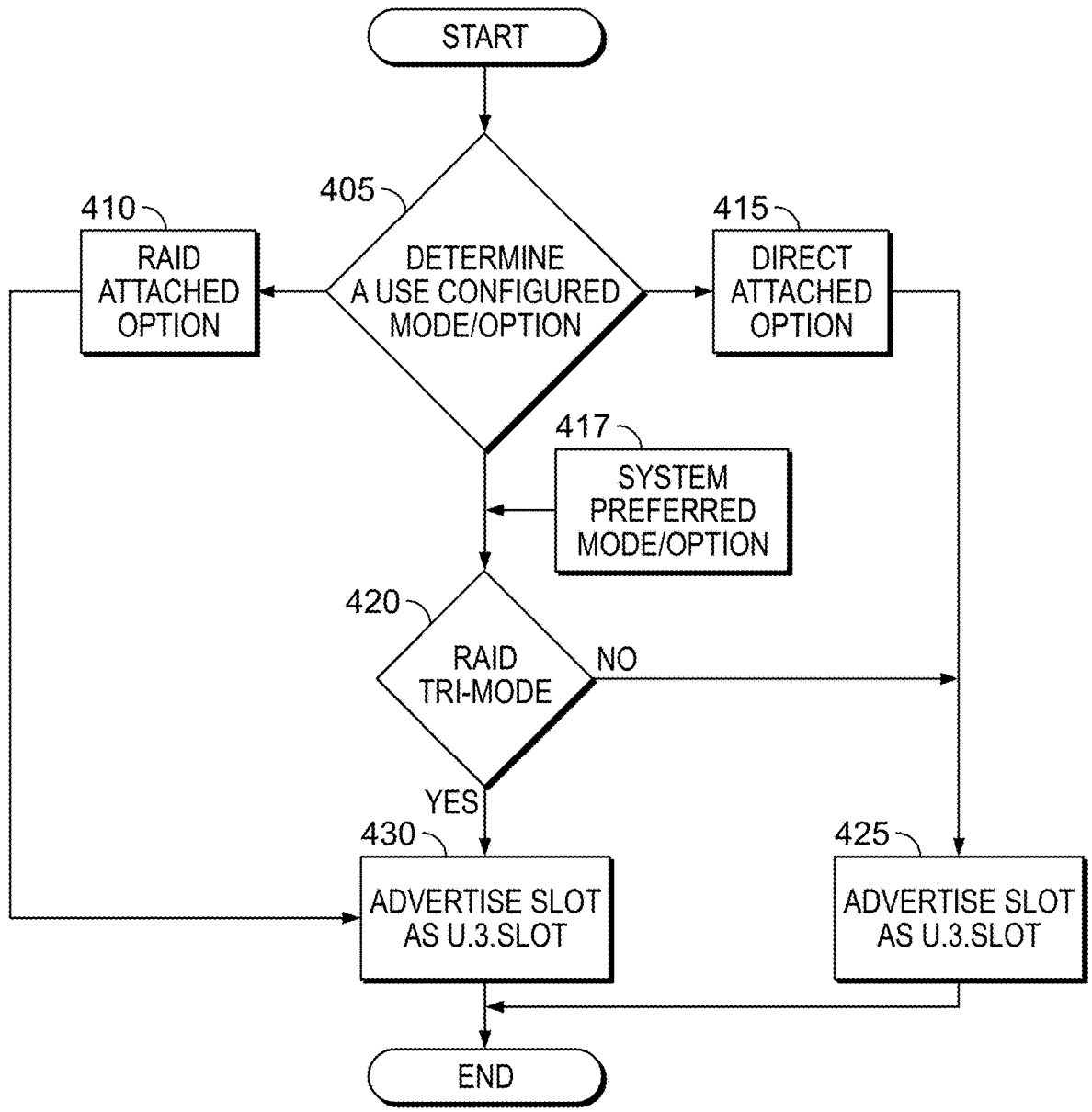
FIG. 4 illustrates an example flowchart of the steps performed by the BMC to determine the user-configured mode and RAID tri-mode device to advertise one or more slots as U.2 slots or U.3 slots according to some embodiments.

FIG. 4 illustrates an example flowchart of the steps performed by the BMC to determine the user-configured mode and RAID tri-mode device to advertise one or more slots as U.2 slots or U.3 slots according to some embodiments. FIG. 4 is described with reference to the components and steps described in FIGS. 1-3. In FIG. 4, at step 405, the BMC 30 implements logic (BMC logic 45) to determine the use configured option. In an embodiment, to determine the use configuration option, the BMC 30 may detect the output of the storage controller 50 and then read the use configured option. In some embodiments, one or more use configured options may be considered one or more modes of operation of the RAID tri-mode device. If the use configured option, at step 415, is for the storage device 80 to be directly attached to the CPU 20, then the BMC 30 will request at step 425, that all the slots 60 be advertised as U.2. slots. The process flow will then terminate, once the slots have been advertised. If the use configured option, at step 410, is for the storage device 80 to be attached via the RAID controller (e.g., the RAID attached option) then the BMC 30 at step 430 requests that all the slots 60 be advertised as U.3 slots.

If it is determined that a use-configured mode at step 405 is not being requested, then the flow will proceed to the output, to step 420, and determine if it is a system-preferred option 417. The system's preferred option is another mode, which is different (or opposed) to the use (e.g., user) preferred option. At step 420, the FPGA 15 is configured for a tri-mode of operation via the system's preferred option, and the UBM 307 identifies the device attached and reports to the FPGA 15 (e.g., reports to the BMC 30). If the RAID tri-mode is the use configure use option (e.g., the UBM 307 identifies the device attached and reports to the FPGA on the tri-mode expander), then at step 430, the BMC will advertise all the slots as U.3 slots.

If the RAID tri-mode is not the use configured mode, then the BMC 30 will request that all the slots be advertised as U.2 slots.

Figure 5:
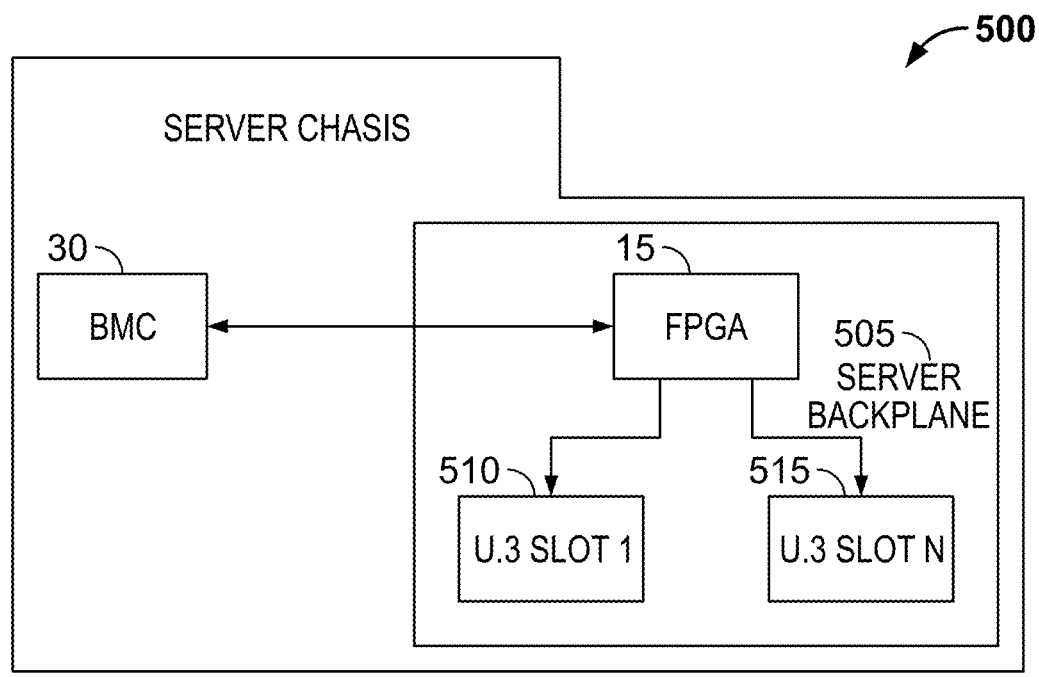
FIG. 5 illustrates an exemplary high-level architecture of a server chassis of a server backplane that implements the BMC control system of FIGS. 1-4, according to some embodiments.

FIG. 5 illustrates an exemplary high-level architecture 500 of a server chassis of a server backplane that implements the BMC control system of FIGS. 1-4, according to some embodiments. In FIG. 5, the server chassis 50 illustrates a server backplane that includes a programmable chip such as FPGA embedded in the server backplane 505 that switches the lanes between a PCIe (PCI Express) sir or a SARA/SAS side based on the device connected on the specific lane so that the CPU root ports and the SAS/SATA devices to RAID controller can be routed to the U.3 slots of a set that includes U.3 slot 1 (510) to U.3 slot N (515).

Figure 6:
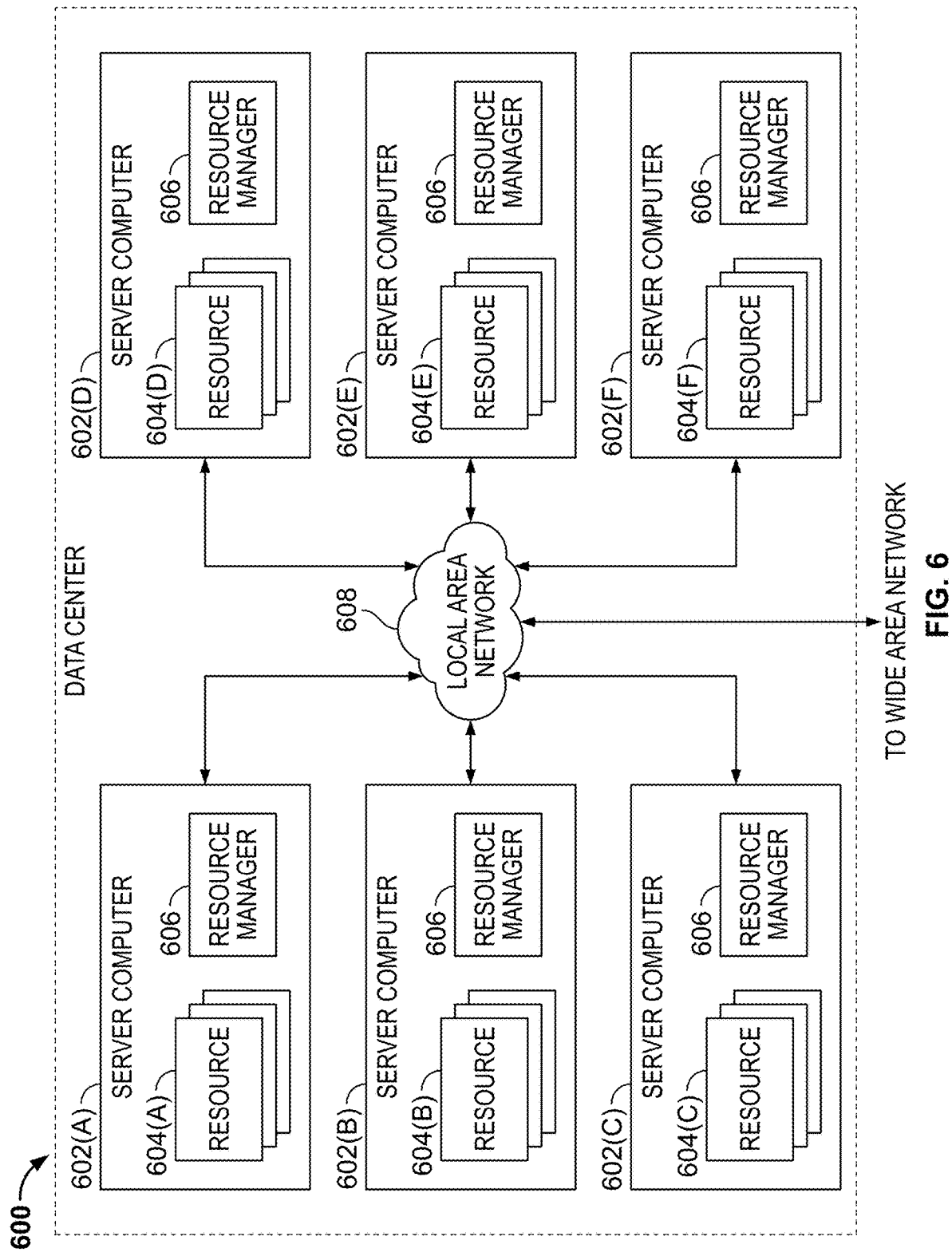
FIG. 6 illustrates a computing system diagram of an exemplary architecture for a data center that may be utilized according to some embodiments.

FIG. 6 illustrates a computing system diagram illustrating a configuration for a Data Center 600 that may be utilized to implement aspects of the technologies disclosed herein. The example Data Center 600 shown in FIG. 6 includes several server computers 602A-602F (which might be referred to herein singularly as "a server computer 602" or in the plural as "the server computers 602) for providing computing resources and for being configured with the server backplane with an embedded FPGA (as described in FIG. 5). In some examples, the resources and/or server computers 602 may include, or correspond to, any type of component, system, or device described herein. Although described as servers, server computers 602 may comprise any type of networked devices, such as servers, switches, routers, hubs, bridges, gateways, modems, repeaters, access points, etc. The device referred to here, may include any computing resources to the network such as data processing, data storage, and resource sharing.

The server computer 602 may be a standard tower, rackmount, or blade server computer configured appropriately for providing computing resources. In some examples, server computers 602 may provide computing resources 604 including data processing resources or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computer 602 in the Data Center 600 may also be configured to provide network services and other types of services.

In the example, Data Center 600 shown in FIG. 6, an appropriate Local Area Network (LAN) 608 may also be utilized to interconnect the server computers 602A-602F. It may be appreciated that the configuration and network topology described herein have been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between Data Centers 600, between each of the server computers 602A-602F in each Data Center 600, and, potentially, between computing resources in each of the server computers 602. It may be appreciated that the configuration of the Data Center 600 described with reference to FIG. 6 is merely illustrative and that other implementations may be utilized.

In some examples, the server computers 602 and or computing resources 604 may each execute/host one or more server backplanes with embedded FPGAs communicating to a BMC to perform techniques described herein.

The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more Data Centers 600 (which might be referred to herein singularly as "a Data Center 600" or in the plural as "the Data Centers 600). The Data Centers 600 are facilities utilized to house and operate computer systems and associated components. The Data Centers 600 typically includes redundant and backup power, communications, cooling, and security systems. The Data Centers 600 may also be located in geographically disparate locations and are one illustrative example of a Data Center 600 that may be utilized to implement the technologies disclosed herein and described herein with regard to, for example, FIGS. 1 through 5.

Figure 7:
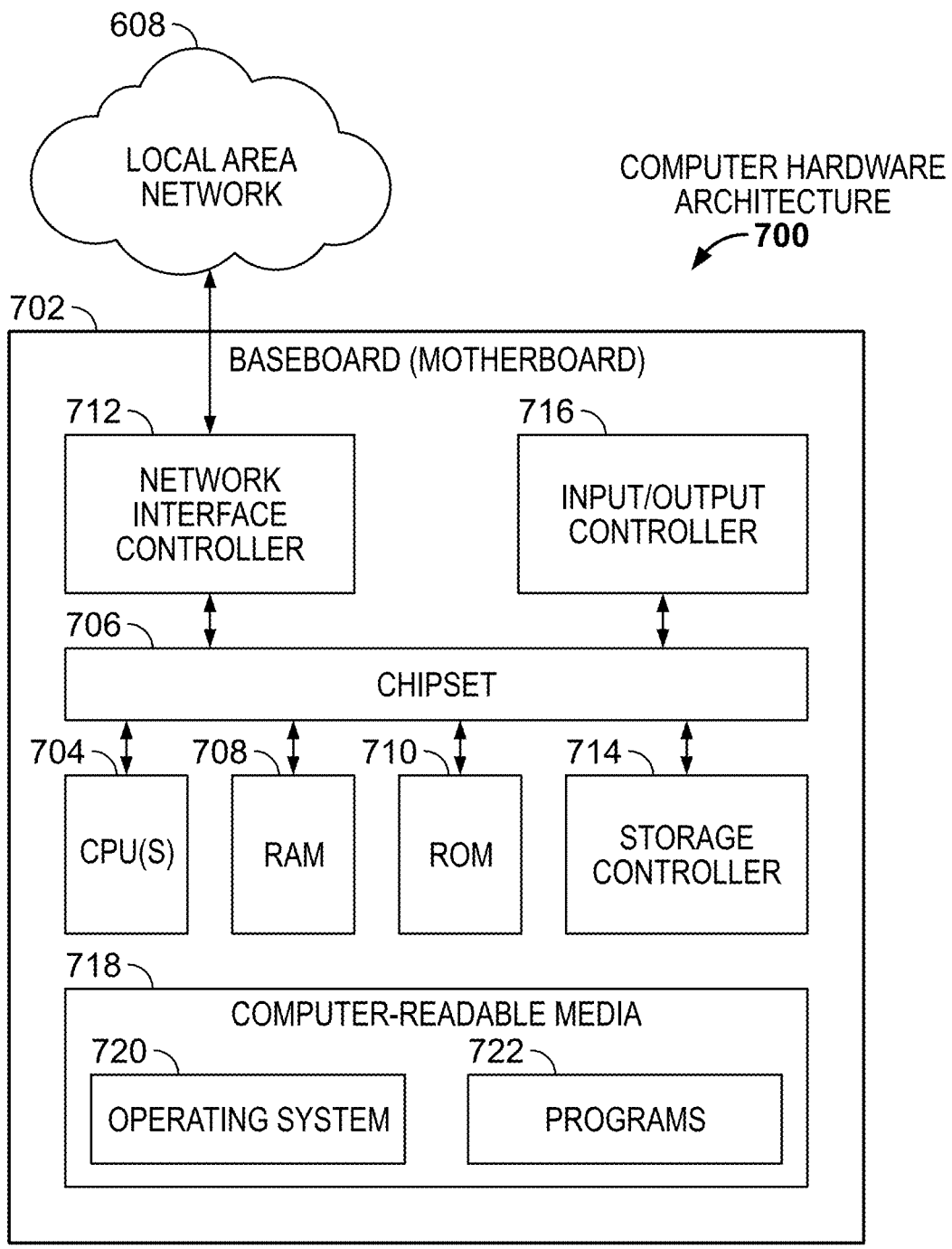
FIG. 7 illustrates a computer architecture diagram of an exemplary computer hardware architecture for implementing a computing device that may be utilized to implement aspects of the cloud systems in FIGS. 1-6 according to some embodiments.

FIG. 7 illustrates a computer architecture diagram showing an example of computer hardware architecture 700 for implementing a computing device that may be utilized to implement aspects of the various technologies presented herein. The example computer hardware architecture ("computer") 700 is shown in FIG. 7 illustrates the computing devices with a universal backplane within a network and/or a workstation, a desktop computer, a laptop, a tablet, a network appliance, an e-reader, a smartphone, or other computing devices, and may be utilized to execute any of the software components described herein. The computer 700 may, in some examples, correspond to a device such as a CPU with a motherboard that hosts a BMC and has an embedded FPGA described herein and may also include other devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706 (such as a programmable chip or FPGA). The CPU 704 may be a standard programmable processor that performs arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPU 704 and the remainder of the components and devices on the baseboard 702 including the baseband management controller (BMC). The chipset 706 may provide an interface to a RAM 708, used as the main memory in the computer 700. The chipset 706 may further provide an interface to a computer-readable storage medium such as read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network. The chipset 706 may include functionality for providing network connectivity through a Network Interface Controller (NIC) 712, RAID card, IT HBA card, Storage Controller Card, or a gigabit Ethernet adapter. The NIC 712 is capable of connecting the computer 700 to other computing devices within the SNIC 704 and external to the SNIC 704. It may be appreciated that multiple NICs 712 may be present in the computer 700, connecting the computer to other types of networks and remote computer systems.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of the physical state may depend on various factors, in different examples of this description. Examples of such factors may include but are not limited to, the technology used to implement the physical storage units, whether the storage device 718 is characterized as primary or secondary storage, and the like.

For example, computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700.

By way of example, and not limitation, computer-readable storage media may include volatile and non-volatile, removable, and non-removable media implemented in any method or technology. Computer-readable storage media includes but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX® operating system. According to another example, the operating system comprises the WINDOWS® Server operating system from MICROSOFT® Corporation of Redmond, Washington. According to further examples, the operating system may comprise the UNIX® operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPU 704 transitions between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may include one or more hardware processor(s) such as the CPU 704 configured to execute one or more stored instructions. The CPU 704 may comprise one or more cores. Further, the computer 700 may include one or more network interfaces configured to provide communications between the computer 700 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi®, and so forth. Programs 722 may comprise any type of program or process to perform the techniques described in this disclosure. Programs 722 may enable the devices described herein to perform various operations.

Clause 1. A method, comprising: receiving, by a Baseband Management Controller (BMC) configured on a backplane and operably coupled to a storage controller of a storage unit, an output from the storage controller; determining, by the BMC based on a detected output from the storage controller, at least one of a first type of slot coupled to the backplane when attaching the storage unit of a first type, or a second type of slot coupled to the backplane for emulating when attaching the storage unit of a second type; in response to a determination of a first slot type or a second slot type for attaching the storage controller to the backplane by the BMC, reading by the BMC, a use configuration option associated with configuring logic of the BMC for attaching either the storage unit of the first type or for attaching the storage unit of the second type to the backplane; further determining, by the BMC based on the reading of the use configuration option, whether to directly attach the storage unit of the first type based on a logic of the BMC to a processor or to indirectly attach the storage unit of a second type based on the logic of the BMC to the processor; and if the storage unit is determined to be at least directly attachable to the processor based on reading of the use configuration option, enabling a request, via logic of the BMC, for advertising of at least one slot of a set of slots coupled to the backplane to be emulated as a U.2 slot to enable a direct attachment of the storage unit to the processor.

Clause 2. The method of clause 1, further comprising: if the storage unit is determined to be indirectly attachable to the processor based on reading of the use configuration option by the BMC, enabling a request via logic of the BMC, for advertising of at least one slot of a set of slots coupled to the BMC to be emulated as a U.3 slot to enable an indirect attachment of the storage unit to the processor.

Clause 3. The method of clause 2, further comprising: wherein a programmable chip is operably coupled to the BMC; and if the use configuration option enables the direct attachment of the storage unit to the processor, requesting by the BMC, advertisement by the programmable chip of at least one slot as a U.2 slot.

Clause 4. The method of clause 3, further comprising: wherein at least one storage unit is configured as a Nonvolatile Memory Express (NVMe) drive; and causing, by the BMC, the at least one storage unit that is configured as the NVMe drive for the direct attachment to the processor by using a U.2 emulated slot.

Clause 5. The method of clause 4, wherein the U.2 slot is configured to enable the direct attachment to the processor using a storage controller card via a serial bus coupling.

Clause 6. The method of clause 5, further comprising: wherein a Redundant Array of Independent Disks (RAID) controller is operably coupled to the BMC; and if the use configuration option enables the indirect attachment of the storage unit to the processor, requesting by the BMC via the RAID controller, advertisement of at least one slot as a U.3 slot.

Clause 7. The method of clause 6, further comprising: causing, by the BMC, the storage unit which is configured as an NVMe drive to be indirectly attached to the processor via a U.3. slot and for a direct connection of the storage unit to a RAID card.

Clause 8. The method of clause 7, further comprising: if the use configuration option is for an indirectly attached storage unit to the backplane and which is a preferred option, requesting, by the BMC, advertisement by the programmable chip of a slot as an emulated U.3 slot in response to a detection of the RAID card by the BMC.

Clause 9. The method of clause 8, further comprising: causing, by the BMC, the storage unit which is configured as the NVMe drive to be attached to the emulated U.3 slot and to be directly connected to a RAID card in response to the detection of the RAID card by the BMC.

Clause 10. The method of clause 9, further comprising: wherein a Host Bus Adapter (HBA) is operably coupled to the BMC; and in response to a detection of the HBA by the BMC, requesting by the BMC, the programmable chip to advertise at least one slot as a U.2 slot for a direct connection to a storage controller card to the processor via a serial bus coupling.

Clause 11. A method comprising: identifying by a Universal Backplane Management (UBM) component operably coupled to a tri-mode controller to operate simultaneously one or more storage units that are to be directly attached by a Baseband Management Controller (BMC) to a processor, or one or more storage devices that are to be indirectly attached by the BMC to the processor; reporting, by the UBM component, to the tri-mode controller and to the BMC, wherein the tri-mode controller enables at least a first mode for detecting a storage controller coupled to a first type of slot when attaching a storage unit of a first type, or a second mode for detecting the storage controller coupled to a second type of slot when attaching a storage unit of a second type; and in response to identifying by the UBM component, one or more storage devices attached to the BMC, switching, by the tri-mode controller, to operably enable emulating either a first type of slot or a second type of slot based on detection by the BMC of the storage controller coupled to the first type of slot or the second type of slot.

Clause 12. The method of clause 11, wherein in response to detection of the first type of slot by the BMC, switching, by the tri-mode controller, to enable logic of the BMC to emulate the first type of slot.

Clause 13. The method of clause 12, wherein in response to detection of the second type of slot by the BMC, switching, by the tri-mode controller, to enable logic of the BMC to emulate the second type of slot.

Clause 14. The method of clause 13, further comprising switching by a programmable chip to emulate the slot of the first type, and the slot of the second type.

Clause 15. The method of clause 14, wherein the programmable chip is a Field Programmable Gate Array (FPGA).

Clause 16. The method of clause 15, wherein the FPGA comprises at least one high-speed lane switch.

Clause 17. The method of clause 16, wherein the FPGA operates with the UBM to switch a high-speed lane between a Peripheral Component Interconnect Express (PCIe) interface configured on a backplane that hosts the UBM or a Serial Advanced Technology Attachment (SATA) interface configured on the backplane based on a storage unit attachment to the backplane.

Clause 18. A system, comprising: a storage device; and at least one processor communicatively coupled to the storage device, wherein the at least one processor executes application code instructions that are stored in the storage device to cause the system to: receiving, by a Backplane Management Controller (BMC) operably coupled to a storage controller of a storage unit, an output from the storage controller; detecting, by the BMC from a coupling of a storage controller, a first type of slot coupled to the BMC for emulating when attaching a storage unit of a first type, or a second type of slot for using when attaching a storage unit of a second type; in response to detecting the coupling of the storage controller by the BMC, reading by the BMC, a use configuration option associated with configuring logic of the BMC to attach the storage unit of the first type and to attach the storage unit of the second type; determining, by the BMC based on the reading of the use configuration option, whether to directly attach the storage unit of the first type based on a logic of the BMC or to indirectly attach the storage unit of a second type based on the logic of the BMC; and if the storage unit is determined to be directly attached based on a reading of the use configuration option, requesting via logic of the BMC, advertising of a slot of a set of slots coupled to the BMC as a U.2 slot.

Clause 19. The system of clause 18, further comprising: wherein the at least one processor executes application code instructions that are stored in the storage device to cause the system to: if the storage unit is determined to be indirectly attached based on the reading of the use configuration option, requesting via logic of the BMC, advertising of a slot of a set of slots coupled to the BMC as a U.3 slot.

Clause 20. The system of clause 18, further comprising: wherein the at least one processor executes application code instructions that are stored in the storage device to cause the system to: if the use configuration option is to be directly attached, requesting, by the BMC operably coupled to a programmable chip, the programmable chip is configured to advertise the set of slots as U.2 slots.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions.

Further, a skilled programmer would be able to write such a computer program to implement an example of the disclosed examples based on the appended flow charts and associated descriptions in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGAs"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation to encompass such modifications and equivalent structures.

What is claimed is:

1. A method, comprising:
receiving, by a Baseband Management Controller (BMC) configured on a backplane and operably coupled to a storage controller of a storage unit, an output from the storage controller;
determining, by the BMC based on a detected output from the storage controller, at least one of a first type of slot coupled to the backplane when attaching the storage unit of a first type, or a second type of slot coupled to the backplane for emulating when attaching the storage unit of a second type;

in response to a determination of a first slot type or a second slot type for attaching the storage controller to the backplane by the BMC, reading by the BMC, a use configuration option associated with configuring logic of the BMC for attaching either the storage unit of the first type or for attaching the storage unit of the second type to the backplane;

further determining, by the BMC based on the reading of the use configuration option, whether to directly attach the storage unit of the first type based on a logic of the BMC to a processor or to indirectly attach the storage unit of a second type based on the logic of the BMC to the processor; and if the storage unit is determined to be at least directly attachable to the processor based on reading of the use configuration option, enabling a request, via logic of the BMC, for advertising of at least one slot of a set of slots coupled to the backplane to be emulated as a U.2 slot to enable a direct attachment of the storage unit to the processor.

2. The method of claim 1, further comprising:
if the storage unit is determined to be indirectly attachable to the processor based on reading of the use configuration option by the BMC, enabling a request via logic of the BMC, for advertising of at least one slot of a set of slots coupled to the BMC to be emulated as a U.3 slot to enable an indirect attachment of the storage unit to the processor.

3. The method of claim 2, further comprising:
wherein a programmable chip is operably coupled to the BMC; and
if the use configuration option enables the direct attachment of the storage unit to the processor, requesting by the BMC, advertisement by the programmable chip of at least one slot as a U.2 slot.

4. The method of claim 3, further comprising:
wherein at least one storage unit is configured as a Nonvolatile Memory Express (NVMe) drive; and
causing, by the BMC, the at least one storage unit that is configured as the NVMe drive for the direct attachment to the processor by using a U.2 emulated slot.

5. The method of claim 4, wherein the U.2 slot is configured to enable the direct attachment to the processor using a storage controller card via a serial bus coupling.

6. The method of claim 5, further comprising:
wherein a Redundant Array of Independent Disks (RAID) controller is operably coupled to the BMC; and
if the use configuration option enables the indirect attachment of the storage unit to the processor, requesting by the BMC via the RAID controller, advertisement of at least one slot as a U.3 slot.

7. The method of claim 6, further comprising:
causing, by the BMC, the storage unit which is configured as an NVMe drive to be indirectly attached to the processor via a U.3. slot and for a direct connection of the storage unit to a RAID card.

8. The method of claim 7, further comprising:
if the use configuration option is for an indirectly attached storage unit to the backplane and which is a preferred option, requesting, by the BMC, advertisement by the programmable chip of a slot as an emulated U.3 slot in response to a detection of the RAID card by the BMC.

9. The method of claim 8, further comprising:
causing, by the BMC, the storage unit which is configured as the NVMe drive to be attached to the emulated U.3 slot and to be directly connected to a RAID card in response to the detection of the RAID card by the BMC.

10. The method of claim 9, further comprising:
wherein a Host Bus Adapter (HBA) is operably coupled to the BMC; and
in response to a detection of the HBA by the BMC, requesting by the BMC, the programmable chip to advertise at least one slot as a U.2 slot for a direct connection to a storage controller card to the processor via a serial bus coupling.

11. A system, comprising:
a storage device; and
at least one processor communicatively coupled to the storage device, wherein the at least one processor executes application code instructions stored in the storage device to cause the system to perform steps of:
receiving, by a Backplane Management Controller (BMC) operably coupled to a storage controller of a storage unit, an output from the storage controller;
detecting, by the BMC from a coupling of a storage controller, a first type of slot coupled to the BMC for emulating when attaching a storage unit of a first type, or a second type of slot for using when attaching a storage unit of a second type;
in response to detecting the coupling of the storage controller by the BMC, reading by the BMC, a use configuration option associated with configuring logic of the BMC to attach the storage unit of the first type and to attach the storage unit of the second type;
determining, by the BMC based on the reading of the use configuration option, whether to directly attach the storage unit of the first type based on a logic of the BMC or to indirectly attach the storage unit of a second type based on the logic of the BMC; and
if the storage unit is determined to be directly attached based on a reading of the use configuration option, requesting via logic of the BMC, advertising of a slot of a set of slots coupled to the BMC as a U.2 slot.

12. The system of claim 11, further comprising:
wherein the at least one processor executes application code instructions stored in the storage device to cause the system to perform steps of:
if the storage unit is determined to be indirectly attached based on the reading of the use configuration option, requesting via logic of the BMC, advertising of a slot of a set of slots coupled to the BMC as a U.3 slot.

13. The system of claim 11, further comprising:
wherein the at least one processor executes application code instructions stored in the storage device to cause the system to perform steps of:
if the use configuration option is to be directly attached, requesting, by the BMC operably coupled to a programmable chip, the programmable chip is configured to advertise the set of slots as U.2 slots.

14. The system of claim 13, further comprising:
wherein at least one storage unit is configured as a Nonvolatile Memory Express (NVMe) drive;
wherein the at least one processor executes application code instructions stored in the storage device to cause the system to perform steps of:
causing the at least one storage unit, configured as the NVMe drive to enable direct attachment via a U.2 emulated slot.

15. The system of claim 14, wherein the U.2 slot is configured to enable the direct attachment to the processor using a storage controller card via a serial bus coupling.

16. The system of claim 15, wherein a Redundant Array of Independent Disks (RAID) controller is operably coupled to the BMC; and wherein the at least one processor executes application code instructions stored in the storage device to cause the system to perform steps of:
if the use configuration option enables the indirect attachment of the storage unit to the processor, requesting by the BMC via the RAID controller, advertisement of at least one slot as a U.3 slot.

17. The system of claim 16, further comprising:
wherein the at least one processor executes application code instructions stored in the storage device to cause the system to perform steps of:
causing, by the BMC, the storage unit which is configured as an NVMe drive to be indirectly attached to the processor via a U.3. slot and for a direct connection of the storage unit to a RAID card.

18. The system of claim 17, further comprising:
wherein the at least one processor executes application code instructions stored in the storage device to cause the system to perform steps of:
if the use configuration option is for an indirectly attached storage unit to a backplane and which is a preferred option, requesting, by the BMC, advertisement by the programmable chip of a slot as an emulated U.3 slot in response to a detection of the RAID card by the BMC.

19. The system of claim 18, further comprising:
wherein the at least one processor executes application code instructions stored in the storage device to cause the system to perform steps of:
causing, by the BMC, the storage unit which is configured as the NVMe drive to be attached to the emulated U.3 slot and to be directly connected to a RAID card in response to the detection of the RAID card by the BMC.

20. The system of claim 19, wherein a Host Bus Adapter (HBA) is operably coupled to the BMC; and wherein the at least one processor executes application code instructions stored in the storage device to cause the system to perform steps of:
in response to a detection of the HBA by the BMC, requesting by the BMC, the programmable chip to advertise at least one slot as a U.2 slot for a direct connection to a storage controller card to the processor via a serial bus coupling.

* * * * *